T. A. B. PUTNAM.
Electric Railroad Signal.

No. 230,494. Patented July 27, 1880.

Witnesses:
Henry Connett
Arthur C. Fraser

Inventor:
Theodore A. B. Putnam

T. A. B. PUTNAM.
Electric Railroad Signal.

No. 230,494.  Patented July 27, 1880.

Witnesses:  Inventor

UNITED STATES PATENT OFFICE.

THEODORE A. B. PUTNAM, OF NEW YORK, N. Y.

ELECTRIC RAILROAD-SIGNAL.

SPECIFICATION forming part of Letters Patent No. 230,494, dated July 27, 1880.

Application filed March 11, 1879.

*To all whom it may concern:*

Be it known that I, THEODORE A. B. PUTNAM, of the city, county, and State of New York, have invented certain Improvements in Electric Railway-Signals, of which the following is a specification.

My invention relates, in part, to certain mechanism whereby an electric circuit confined to the locomotive or train is caused to sound an alarm on the same, and thus indicate defects in established circuits similar to those shown in my Patent No. 182,384, of September 19, 1876.

It relates also to certain shifting mechanism, whereby the signal system may be adapted either to single or double track roads, all of which will be more fully hereinafter set forth.

The principle upon which I base my defect circuit and signal is as follows: From the two poles of a battery two circuits are formed at the same time, which circuits differ in resistance or in the work to be done to such a degree that when the circuit of lesser resistance is complete the circuit of greater resistance cannot act, the battery power not being sufficient for both; but when the circuit of lesser resistance is broken from any cause, then the full battery-current will be thrown upon the circuit of higher resistance, and it will have power to sound a signal or alarm controlled by its circuit and announce such break.

I have said that the circuits differ in resistance. This difference may be produced or controlled by employing wire differing in gage, or by the difference in tension at the working point, the work to be done indicating the resistance of the circuit performing it. In this case what I mean to designate by a circuit of high resistance is one which will require more of the battery power to render it effective than the other circuit or circuits with which it is combined.

Figure 1:
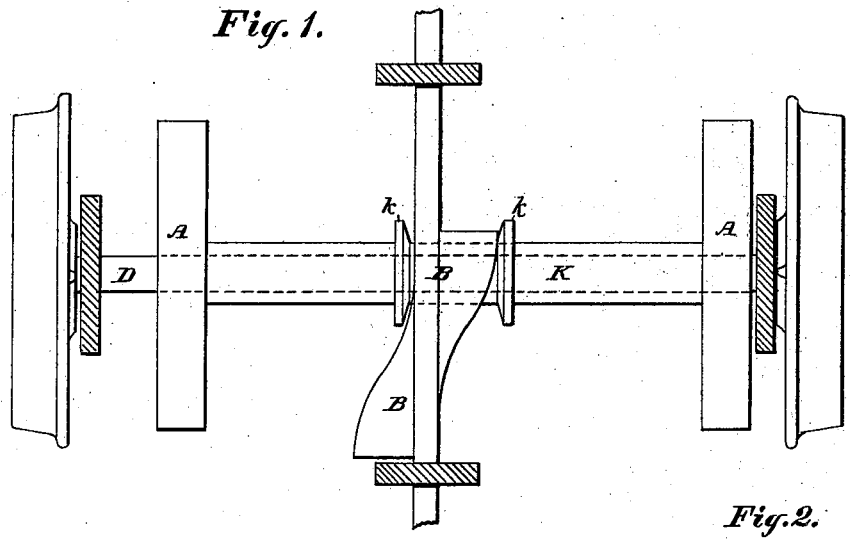
Figure 2:
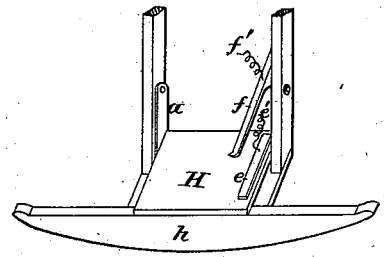
Figure 3:
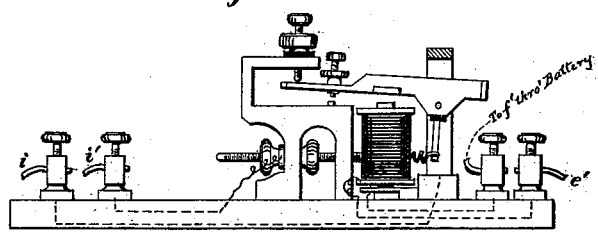
Figure 4:
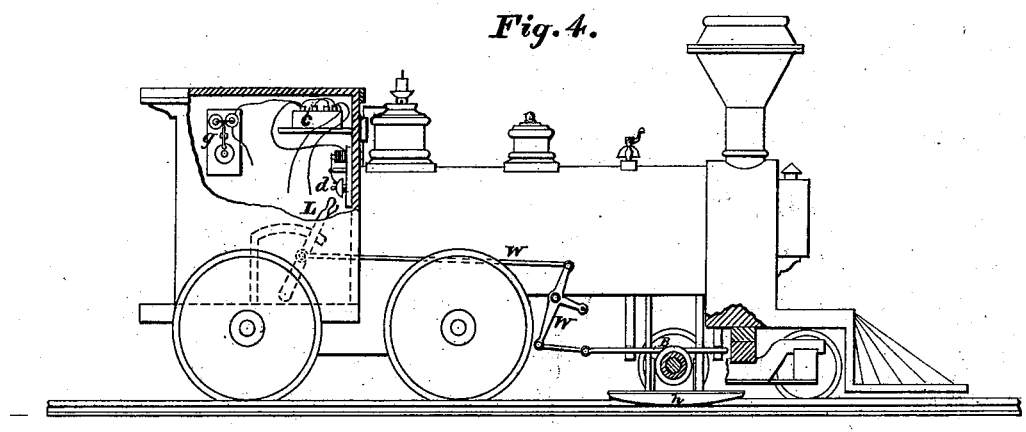
Figure 5:
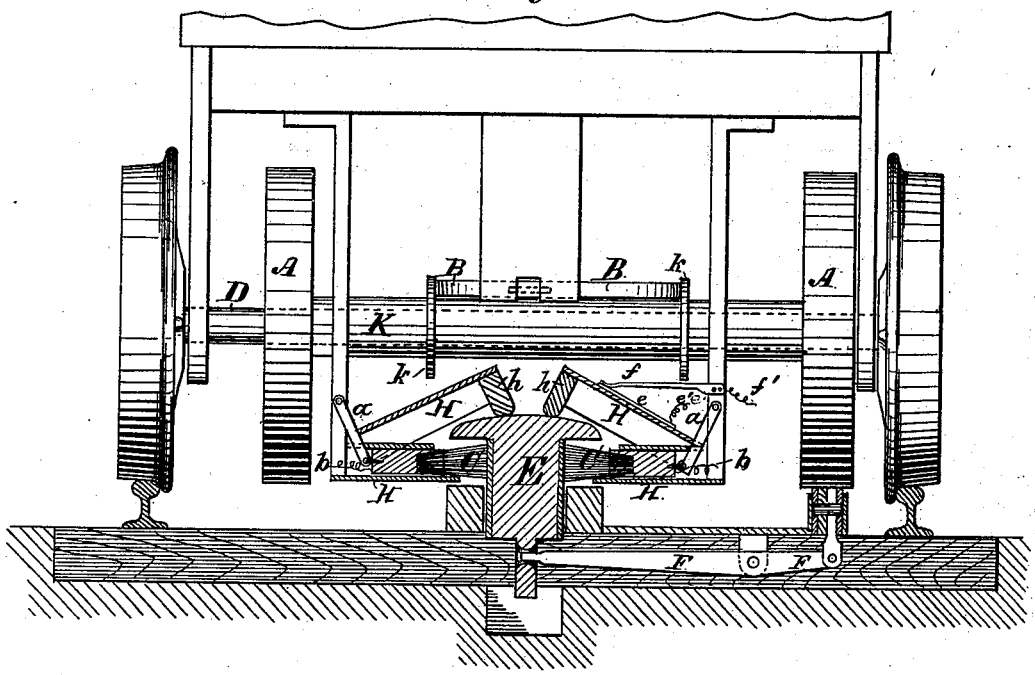
Figure 6:
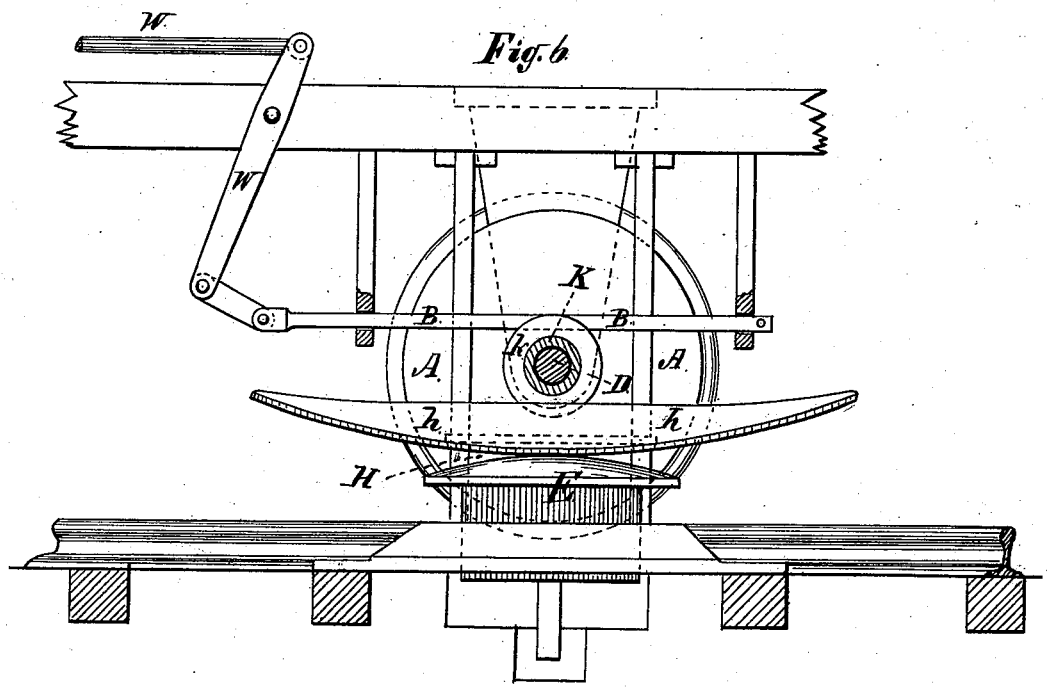

In the drawings, which serve to illustrate my invention, Figure 1 is a plan view, arranged to illustrate the shifting of the extra or operating wheels. Fig. 2 is a detached view, showing the box containing the brush-conductors. Fig. 3 is an enlarged view of a magnetic apparatus, such as I prefer to employ for operating the alarm or signal on the locomotive or train. Fig. 4 is a side view, partly in section, showing a locomotive provided with my improvements. Fig. 5 is a view fronting the locomotive, arranged to show the contact of the conductors. Fig. 6 is a longitudinal mid-section of Fig. 5.

Some portions of the mechanism here illustrated are shown in my former Patent No. 182,384, and need only be referred to herein so far as they operate in connection with the new features. These are the road-bed conductor E, (see Figs. 5 and 6,) arranged to be protruded through the medium of a lever, F, and a depressor-lever, adapted to be acted upon by the wheel of the passing locomotive. This protruded conductor is adapted to be brought into contact with brush-conductors borne by the locomotive, whereby proper signals are sounded both on the locomotive and along the line, as fully set forth in my patent before mentioned.

Let C C represent brush-conductors, preferably formed of wire and arranged in covered boxes H H. The bottom of the box H is fixed to some part of the locomotive, and the cover is hinged and connected with the brush in such a manner that the brush is protruded when the cover is raised. This may be done by fixing the brush-stock in guides and linking it to the prolonged extremities of the box-hinges $a$, as clearly shown in Fig. 5. The brush is thus housed and protected when not employed to contact with the conductor E. The brushes C C connect by wires $b$ $b$ with the battery $c$ on the locomotive, (see Fig. 4,) one direct and one through the alarm $d$. These form the low-resistance circuit before mentioned.

Attached to the front or free edge of the cover of the box H is a curved rider, $h$, adapted to ride over the roof of the protruded conductor E. This is prolonged considerably beyond the limits of the box H in both directions, (see Figs. 2 and 6,) so that on approaching the road-bed conductor from either direction one extremity will be over the roof of the same when it is protruded, and thus insure the lifting of the box-cover and the protrusion of the brushes. This rider $h$ is deepest at the center, as shown, and in consequence of this the cover is raised to its highest point when the center of the brush C is opposite the center of the conductor E. This point having been reached and such contact assured as will close the circuits of low resistance, the circuit of high resistance is closed by means of the following described mechanism: A conductor, e, is attached to one of the box-covers, and connected by a wire, e', with one pole of the battery c. This conductor contacts, when the cover is raised to its full height, with another conductor, f, connected by a wire, f', with the other pole of the battery c, passing through an alarm, g.

In Fig. 4 I have shown the battery and alarms with the necessary conducting-wires; but I have not thought it necessary to show how these lead to the boxes H, as they may be arranged in any way that is found most convenient, provided they terminate at the proper points.

In my Patent No. 182,384, before mentioned, I show an extra wheel arranged to act upon the levers, and thus protrude the road-bed conductor.

To operate my defect-alarm when the locomotive is backing, (and consequently reversed end for end,) it is, however, necessary that the extra wheel should be capable of being shifted from one side to the other. To accomplish this I place upon the axle D (see Figs. 1 and 5) a sleeve, K, not so long as the axle, so as to allow of some end play. On this sleeve I fix two wheels, A A, which I denominate "extra" wheels, and which serve to actuate the conductor E.

The sleeve K is provided with two collars or flanges, k k, and between these are arranged to play reversed cams B B, secured to operating arms or levers W, connected with the reversing-lever L of the locomotive. Thus the act of reversing by the engineer shifts the sleeve bearing the wheels A A from one side to the other, enabling that on one end to clear the operating-levers on the track, while it brings the wheel on the other side into position to operate the other set of road-bed conductors.

I would here observe that on single-track roads, where trains are running in both directions, a duplication of some of the track mechanism is necessary, so that the train may always signal ahead, or in the direction in which it is running. Therefore I employ two wheels, A A, so that one will always be in operative position whether the train be backing or running head on.

I prefer, for convenience, to connect the mechanism for shifting the wheels A A with the reversing-lever of the locomotive; but it may be arranged to be actuated independently if found desirable.

I may also employ semaphores or visible signals in lieu of bells or gongs; but the latter are considered preferable. Where a bell is employed it may be an ordinary electric bell-alarm placed in the circuit formed by the wires i i' in Fig. 3.

It will also be understood that my defect-signal circuit may operate in connection with one or more circuits of low resistance, some one of which serves to actuate mechanism along the line for locking switches, &c. In such circuits no alarm or signal is placed on the locomotive.

It will also be observed that to insure the proper operation of the defect-circuit the closing of the circuit or circuits of low resistance at the road-bed conductor E must be assured before the closing of the said defect-circuit; otherwise the latter would sound the alarm when no defect exists.

Having thus described my invention, what I claim is—

1. An electric circuit confined to the locomotive and arranged to sound an alarm by the bringing into contact of a conductor borne by the cover of the box H and connecting with one pole of the battery c, and another conductor, f, connecting with the other pole of the battery, substantially as set forth.

2. The combination, with an electric circuit used for signal and other purposes and arranged to be closed by the contact of a locomotive with a road-bed conductor, of another circuit from the same battery, closed simultaneously with the first, or while the first is closed, and by the same means, and made effective to actuate an alarm or signal by a defect in the first-named circuit, substantially as and for the purposes set forth.

3. The arrangement of the boxes H, whereby the raising of the cover of the same closes an electric circuit to operate an alarm or signal, substantially as described, and at the same time to protrude the brushes C, which serve to close other circuits simultaneously therewith, all for the purposes set forth.

4. The combination of the sleeve K, bearing the wheels A A and collars k k, with the axle D and cams B B, the said cams arranged to be actuated by the reversing mechanism of the locomotive, substantially as and for the purposes set forth.

5. The combination, substantially as herein described, of a circuit or circuits of low resistance confined mainly to the roadway, but of which the locomotive forms a part, the road-bed conductor, and a circuit of high resistance confined to the locomotive or train, all of the circuits being connected with the same battery, all closed by contact of the locomotive with the road-conductor, and the high-resistance circuit, arranged to sound an alarm in case of defect in the other circuit or circuits, substantially as set forth.

THEODORE A. B. PUTNAM.

Witnesses:
E. S. BLACKWELL,
THOS. C. MILES.